United States Patent [19]

Sakai et al.

[11] 4,268,085
[45] May 19, 1981

[54] WIND DEFLECTOR ARRANGEMENT IN SLIDING ROOF DEVICE FOR VEHICLE

[75] Inventors: Kunitaka Sakai, Tokyo; Jun Ono, Shiki, both of Japan

[73] Assignee: Honda Giken Kogyo Kabushiki Kaisha, Tokyo, Japan

[21] Appl. No.: 71,749

[22] Filed: Aug. 31, 1979

[30] Foreign Application Priority Data

Sep. 1, 1978 [JP] Japan .................... 53/120262[U]

[51] Int. Cl.³ .............................................. B60J 7/04
[52] U.S. Cl. ..................................... 296/217; 296/1 S
[58] Field of Search ...................... 296/1 S, 91, 137 J, 296/137 G, 137 B, 137 E, 137 F, 217

[56] References Cited

U.S. PATENT DOCUMENTS

| | | | |
|---|---|---|---|
| 3,156,175 | 11/1964 | Werner et al. | 98/2 |
| 3,711,150 | 1/1973 | Perks | 296/137 E |
| 3,843,195 | 10/1974 | Lidington | 296/137 J |
| 3,904,239 | 9/1975 | Jardin | 296/137 J |
| 3,984,143 | 10/1976 | Vermeulin | 296/137 J |
| 4,067,604 | 1/1978 | Mori | 296/137 J |
| 4,081,194 | 3/1978 | Jardin | 296/15 |
| 4,142,759 | 3/1979 | Bienert | 296/217 |
| 4,175,785 | 11/1979 | Leiter | 296/217 X |

FOREIGN PATENT DOCUMENTS 980012 1/1965 United Kingdom ............ 296/137 J

Primary Examiner—Randolph A. Reese
Assistant Examiner—Norman L. Stack, Jr.
Attorney, Agent, or Firm—Irving M. Weiner; Pamela S. Burt; John L. Shortley

[57] ABSTRACT

A wind deflector arrangement in a sliding roof for a vehicle which includes a roof opening, the front edge of which is curved forwardly along the upper edge of a front window of the vehicle. A wind deflector is arcuated to conform with a curvature of the upper surface of the roof and with a curvature of the front edge of the roof opening. Arms are pivotally mounted on the inner side edges of the roof opening. The wind deflector is supported at rear ends thereof by the arms, so as to be able to be angular displaced with respect to the arms, through resilient members.

9 Claims, 11 Drawing Figures

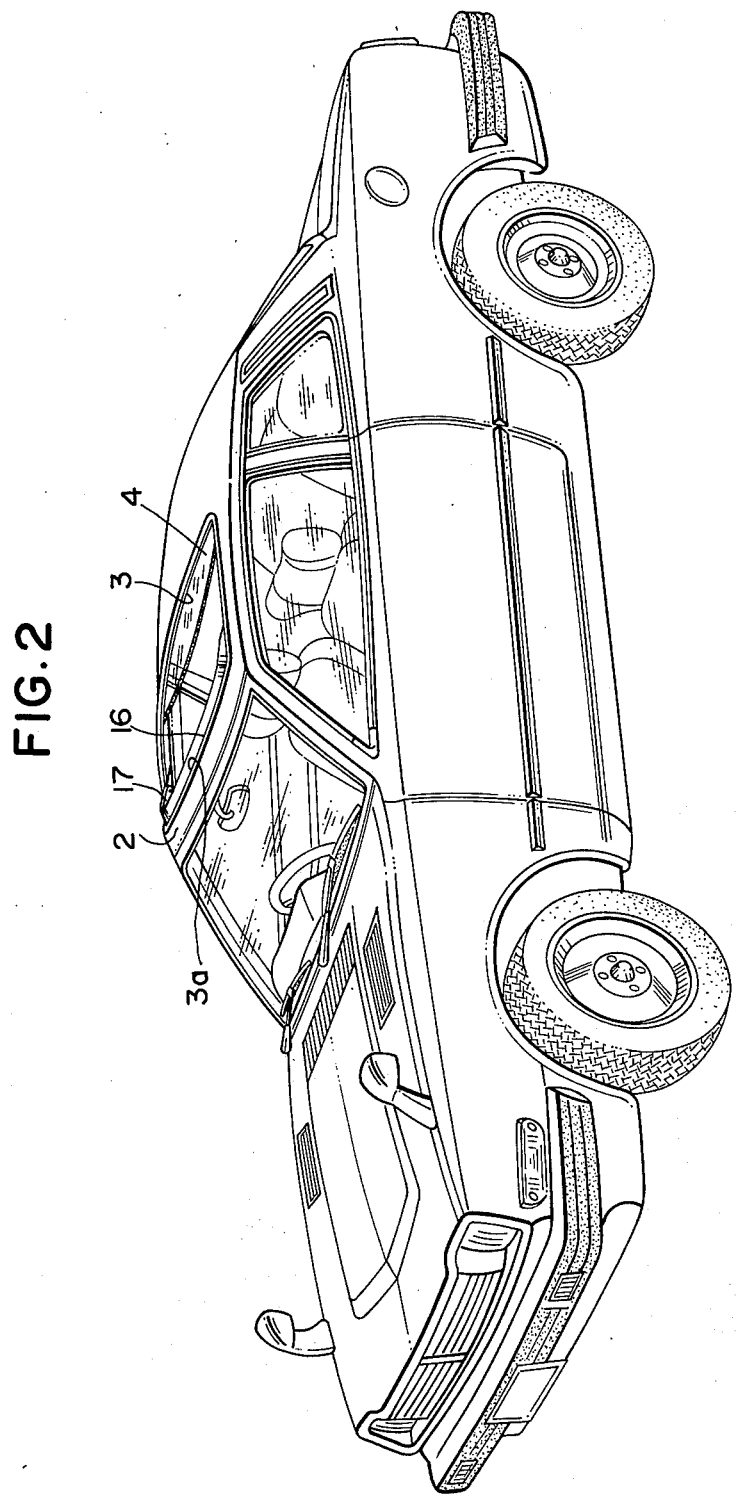

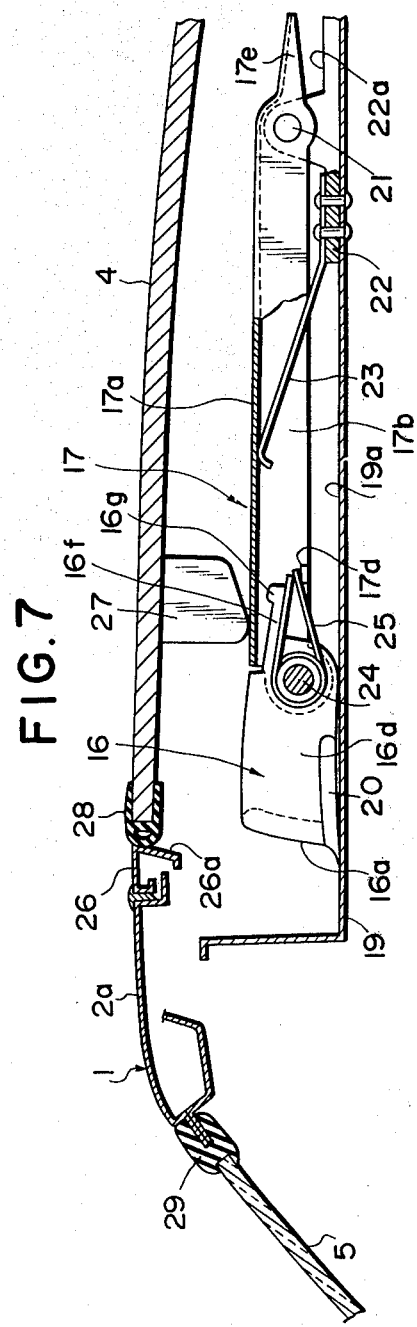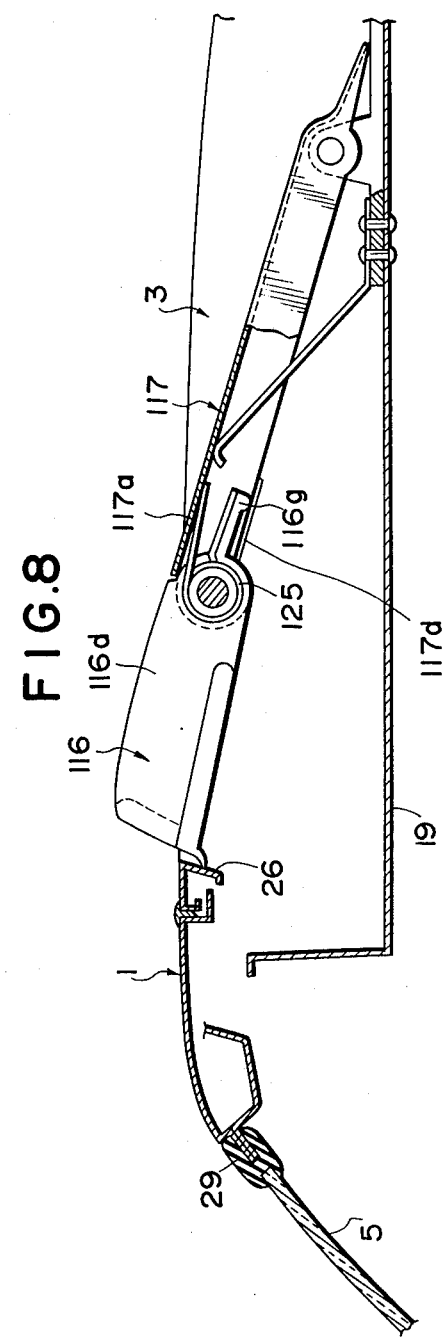

WIND DEFLECTOR ARRANGEMENT IN SLIDING ROOF DEVICE FOR VEHICLE

BACKGROUND OF THE INVENTION

1. Field of the Invention

The present invention relates to improvements in a wind deflector employed in a sliding roof device for a vehicle so as to prevent noises caused by an air current and to prevent air flow from entering the vehicle interior when a slide roof member is retracted to an open position.

2. Description of Relevant Art

A sliding roof device is known wherein an opening is formed on a roof of a vehicle and is adapted to be closed by a slide roof member made of glass or the like. In such a sliding roof device, loud noises may be produced during the running of the vehicle with the sliding roof device in an open position, due to air flow into the interior of the vehicle and air suction from the interior of the vehicle, caused by fast air current flowing along the roof. To prevent such noise and air flow into the vehicle, a wind deflector is provided at the front edge of the opening for the purpose of deflecting streams of air upwardly, so that air suction from the interior of the vehicle and resulting noises may also be avoided.

In the conventional sliding roof device, the front edge of the opening is formed to be straight across the width thereof, regardless of the line of the upper edge of the vehicle windshield, and the wind deflector provided retractably with respect to the opening on the roof is formed to have a flat plate shape. The height of such a wind deflector projected out above the roof of the vehicle through the opening cannot be uniform over the entire length of the deflector due to the convex curvature of the roof surface, i.e., the roof is curved to be lower at the sides thereof and higher around the center thereof, while the upper edge of the deflector is formed straight over its entire length. Thus, the deflector does not provide an effective guiding action for the air current. Accordingly, when the air current deflects from the flat plate, undesirable noises may be produced, and air may flow into the vehicle interior. The conventional wind deflector construction thus fails to provide effective prevention of air current noises. Furthermore, it is not possible to obtain sufficient open space over the driver and passenger seats due to the straight front edge of the roof opening in the conventional structure, thus decreasing the feeling of openness or freedom to the persons in the front seats of the vehicle.

As shown in FIGS. 10 and 11 of the accompanying drawings, if the wind deflector 6 is provided integrally with arms 7, 7, which are so arranged as to be retractable with respect to the opening 3, in the raised state shown in FIG. 10 an effective deflection can be obtained without any specific problems. However, in the lowered and retracted state with the opening 3 closed by the slide roof member 4 as shown in FIG. 11, a recessed portion 8 will be required for housing the deflector 6 at the front end of a slide roof frame 9 because of the greater height of the deflector. The recessed portion 8 protrudes toward the front part of the vehicle interior, and consequently reduces the head clearance on the under surface side of the roof, resulting in an undesirable feeling of confinement to the persons in the front seats of the vehicle.

The present invention effectively solves the foregoing problems attendant to conventional wind deflector constructions, and particularly those problems associated with arm-integral-type deflectors as described above.

SUMMARY OF THE INVENTION

The present invention provides a wind deflector arrangement in a vehicle sliding roof device wherein the front edge of an opening on the roof is curved in parallel with the upper edge of a windshield, and a wind deflector is curved along the front edge of the opening and is arcuated along the upper convex surface of the roof to form a three-dimensional shape. The wind deflector is supported at the rear ends thereof by arms which are pivotally mounted on the inner side edges of the opening, so that the wind deflector is capable of angular displacement with respect to the supporting arms through a resilient member.

An object of the present invention is to provide a wind deflector arrangement which provides a satisfactory feeling of openness or freedom to persons in the front seats of the vehicle, and is highly effective in preventing air current noises by functioning very effectively as a regulator and guide for such air current.

Another object of the invention is to provide a wind deflector arrangement wherein when a slide roof member is closed, the wind deflector is angularly displaced with respect to the supporting arms so as to be housed in a very narrow space, even if the height of the deflector is relatively high, thus assuring a satisfactory head clearance in a limited vehicle interior space.

A further object of the invention is to provide a wind deflector arrangement which is simple in structure and inexpensive to manufacture, while at the same time providing a highly effective deflection or air current when in use.

Other objects and advantages of the present invention will become apparent from the following detailed description when read in conjunction with the accompanying drawings, with preferred embodiments of the invention being described in detail by way of example.

BRIEF DESCRIPTION OF THE DRAWINGS

FIG. 2 is a perspective view of a vehicle having a wind deflector exposed above a roof of the vehicle, with a slide roof member retracted.

FIG. 7 is a view similar to FIG. 5, showing a wind deflector housed under the roof of a vehicle.

FIG. 8 shows a second modified embodiment of the present invention.

DETAILED DESCRIPTION OF PREFERRED EMBODIMENTS

Figure 9:
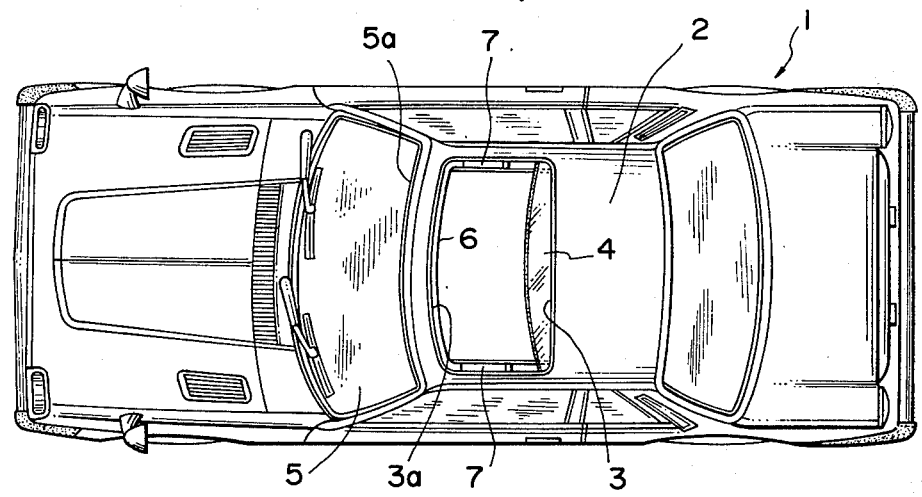
FIG. 9 is a plan view of a vehicle provided with a sliding roof device having a wind deflector arrangement in accordance with the invention.
Figure 10:
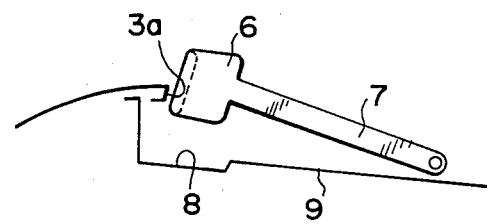
FIGS. 10 and 11 are views of a wind deflector provided integrally with supporting arms.
Figure 11:
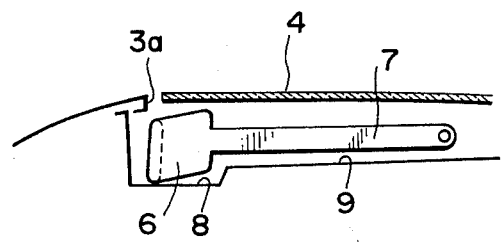

A vehicle 1 shown in FIG. 9 is provided with a sliding roof device having a wind deflector arrangement according to the invention. An opening 3 on a roof 2 of the vehicle 1 has the front edge 3a thereof curved along the upper edge 5a of a windshield 5 so as to be parallel thereto. A wind deflector 6 is made of synthetic resin, for example, in a substantially arcuate U-shape.

Figure 1:
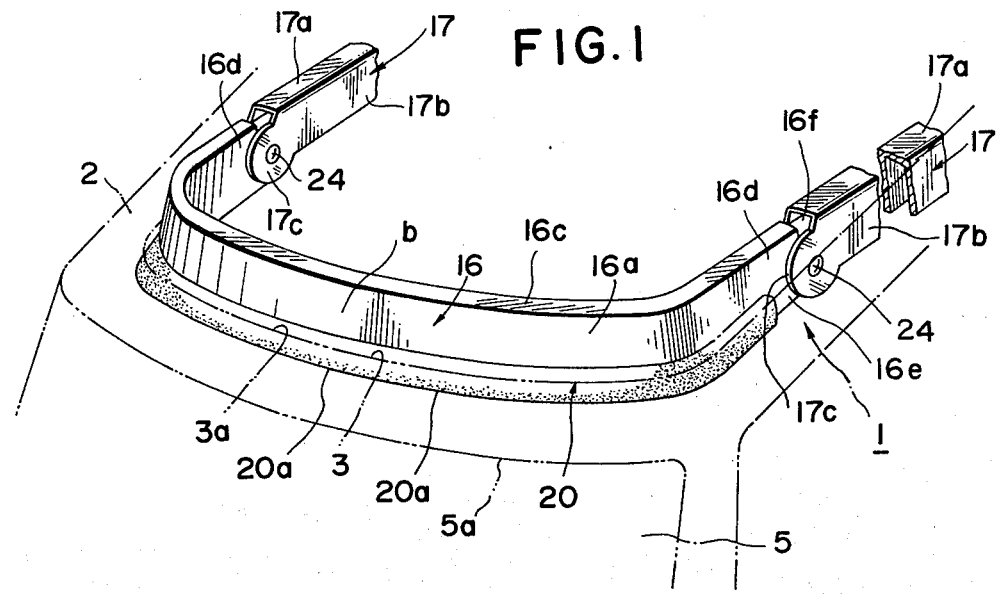
FIG. 1 is a perspective view partially broken away to show a wind deflector arrangement in accordance with the present invention.
Figure 3:
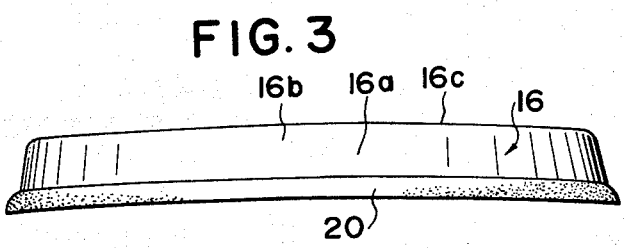
FIG. 3 is a front view of the wind deflector of FIG. 1.
Figure 4:
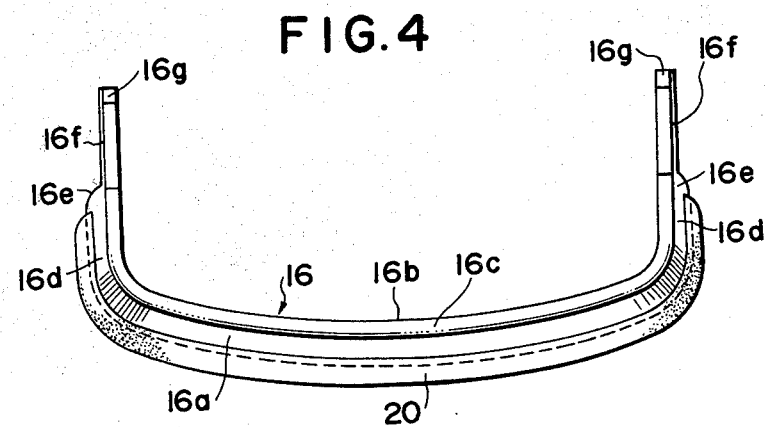
FIG. 4 is a plan view of the wind deflector of FIG. 1.

The wind deflector is shown in greater detail in FIGS. 1, 3 and 4, wherein the deflector is generally designated at 16. A front portion 16a of the deflector (FIG. 4) is curved forwardly at the center 16b thereof, the curvature of which is substantially the same as that of the front edge 3a of opening 3, i.e., the curvature of the upper edge 5a of windshield 5. The upper edge 16c of front portion 16a is highest in front elevation at the center 16b thereof, as best shown in FIG. 3, with the right and left sides thereof being reduced in height. Thus, the curvature of upper edge 16c is so designed as to be substantially the same as that of the profile of the upper convex surface of roof 2 near the front edge 3a of opening 3. A lip-shaped seal member 20, which may be made of rubber or the like, is provided to receive the total length of the lower edge of front portion 16a, and part of the lower edge of side portions 16d. A lip 20a is formed along the leading edge of seal member 20, extending outwardly in the forward direction. The side portions 16d of wind deflector 16, which are extended rearwardly so as to be parallel to each other, are provided with fitting portions 16e at the rear ends thereof. The fitting portions 16e have extensions 16f formed integrally therewith and extending rearwardly, and are provided with protrusions 16g serving as stoppers at the respective rearmost ends thereof.

Figure 5:
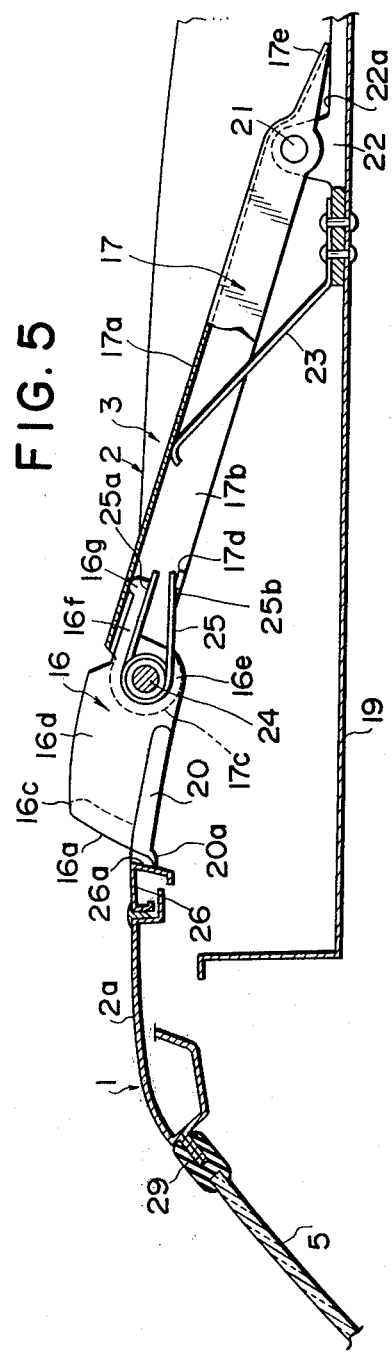
FIG. 5 is a sectional side view of the essential parts of the wind deflector of FIG. 1, shown in an operable position.

As shown in FIG. 5, arms 17, 17 are pivotally connected to side ends of a roof slide frame 19 in roof opening 3. The arms 17 are provided with a channel section, with the open side thereof directed downwardly, and are mounted at their rear ends by pins 21 on brackets 22 which are fixed on frame 19, so that arms 17 are capable of swinging. Leaf springs 23, which are each fixed at one end thereof on a bracket 22, are kept in contact at the other ends thereof with the under face of upper wall 17a of arms 17. Thus, arms 17 are resiliently urged upwardly a predetermined amount. The upward movement of arms 17 is limited by engagement of the rear end 17e of arms 17 with the upper face 22a of brackets 22.

The fitting portions 16e provided at each rear end of wind deflector 16 are disposed between fitting pieces 17c provided integrally at each front end of arms 17 respectively, and are pivoted with pins 24 passing through fitting pieces 17c. Torsion springs 25, which are provided around the pins 24, are held at one end 25a thereof against the under face of the extensions 16f, and are held at the other 25b thereof against projections 17d provided on one side 17b of arms 17. Thus, the wind deflector 16 is forced to turn counterclockwise by means of coil torsion springs 25, with the leading edge thereof urged downwardly until the stopper 16g strikes against the under face of the upper wall 17a of arms 17, as shown in FIG. 5.

The operation of the device will now be described in detail hereinbelow.

FIG. 5 shows the wind deflector 16 in use, and raised from the roof through opening 3. The arms 17 are lifted to the upper limit thereof by means of leaf springs 23. The lip 20a of seal member 20 provided along the lower edge of wind deflector 16 is kept in contact with the inner side face 26a of a molding 26 provided to surround the opening 3 along the inner periphery, with most of the upper areas of deflector 16 being disposed above the roof. The height of such upwardly-disposed area of deflector 16 is controlled by engagement of stopper 16g with the upper wall 17a of arms 17.

With such arrangement of wind deflector 16 as described above, the forwardly curved wind deflector 16 can make perfect sealing contact at lip 20a. Furthermore, because the wind deflector 16 is curved upwardly so as to follow the contour of the upper convex surface of roof 2, the height thereof from the surface of the roof to the upper edge of wind deflector 16 will be uniform over the entire length of wind deflector 16. The side portions 16d of deflector 16 will cover the side areas of the roof of the vehicle. An air stream produced along the front area 2a of roof 2 during running of the vehicle will be directed upwardly by wind deflector 16, and toward both sides thereof. Air may therefore flow smoothly upwardly and sidewardly due to the specific shape of wind deflector 16 as described hereinabove. Furthermore, in the present embodiment, the seal member 20 with lip 20a is employed for perfect sealing of molding 26, and thus no air current will be introduced into the vehicle interior through any gap between the front edge 3a of opening 3 and wind deflector 16, which would otherwise normally be formed therebetween. There is therefore provided a sliding roof device which is highly effective in preventing the problem of air flowing into the vehicle interior, as well as resulting noises, even when the vehicle is driven with the opening 3 in its open condition.

Figure 6:
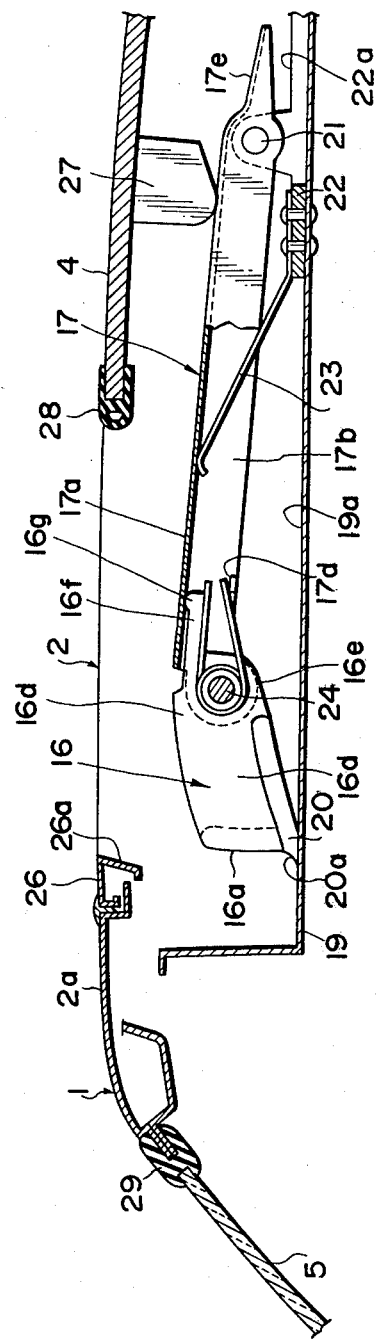
FIG. 6 is a view similar to FIG. 5, showing the wind deflector in a position prior to the finally-housed position thereof.

The slide roof member 4 is slidably moved, as shown in FIGS. 6 and 7, so as to close opening 3. As the roof member 4 is moved forwardly for roof closure, guide pushers 27 provided on the under face of member 4 will abut against the upper walls 17a of arms 17 to push arms 17 downwardly against the forces of leaf springs 23. The arms 17 are pivoted downwardly around pins 21 serving as pivot points. When the lower edge of the front portion 16a of wind deflector 16 engages the floor 19a of roof slide frame 19, the deflector 16 is still directed downwardly at this stage by the force of springs 25 (FIG. 6). Further forward movement of roof member 4 results in further pushing down of arms 17 against coil springs 25. With such movement, the wind deflector 16 is angularly displaced upwardly around the pins 24 against the coil springs 25, with the leading lower edge held against the floor 19a. When the opening 3 is closed by the roof member 4 such that guide pushers 27 are positioned on the front portion of arms 17, as shown in FIG. 7, the arms 17 and wind deflector 16 are substantially co-planar. Thus, there is eliminated any need for space for housing the wind deflector 16 in any recessed portion, which would otherwise be formed on the floor of frame 19. Thus, a sufficient head clearance can be obtained by reducing the depth of the frame 19 in the front part of the roof, while permitting a satisfactory height of the wind deflector 16 as described hereinabove.

In FIG. 7, a seal member 28, made of rubber or the like, is fixed on and covers the periphery of slide roof member 4, and a seal member 29 is provided for windshield 5.

When the opening 3 is opened by retreating the slide roof member 4, the guide pushers 27 are moved rearwardly therewith, and the wind deflector 16 is raised from its positions as shown in FIGS. 6 and 7 into the position shown in FIG. 5, by the force of springs 23 and 25.

In the above described first embodiment of the invention, the wind deflector 16 is resiliently urged downwardly to permit angular displacement thereof, however, the invention further includes the modification shown in FIG. 8.

In FIG. 8, a wind deflector 116 includes elongated side portions 116d, and a stopper 116g is provided on each of the lower sides of side portions 116d. A coil spring 125 is mounted so as to urge the wind deflector 116 in a clockwise direction by its resilience, and thus in the reverse direction of the above-described first embodiment. Each coil spring 125 is held at one end thereof by piece 117d provided on the lower side of each arm 117, and at the other end thereof on the under face of the upper wall of arms 117. Thus, the deflector 116 is urged upwardly with respect to arms 117. In this case, the guide pushers 27 as described hereinabove will directly push down the wind deflector 116. Thus, when the slide roof member 4 is retreated, the wind deflector 116 will be turned upwardly in a raising movement. Consequently, the deflector 116 can be raised above the roof very quickly.

As will be clear from the foregoing detailed description, the wind deflector arrangement in accordance with the invention is highly effective in preventing undesirable air from flowing into the vehicle interior, as well as the noise resulting therefrom. Further, the appearance thereof is enhanced by making uniform the height of the wind deflector projected above the roof. In addition, space for housing the wind deflector within the vehicle interior is saved, due to the three-dimensional design thereof.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A wind deflector arrangement in a sliding roof device for a vehicle which includes an opening on the roof of the vehicle, comprising:
   a wind deflector disposed on the inner side of the front edge of said opening;
   said wind deflector being supported at the rear ends thereof;
   supporting arms pivotally mounted at the rear ends on the inner side of the side edges of said opening;
   said arms supporting said wind deflector at the front ends thereof so that said wind deflector is capable of angular displacement with respect to said supporting arms; and
   resilient means disposed at the connection between said wind deflector and said supporting arms, said resilient means urging said wind deflector in a substantially vertical direction.

2. A wind deflector arrangement according to claim 1, wherein:
   the front edge of said opening is curved so as to be substantially parallel to the upper edge of a windshield; and
   said wind deflector is curved along said front edge of said opening and arcuated at the upper edge thereof substantially along an upper convex surface of said roof of said vehicle.

3. A wind deflector arrangement according to claim 1, wherein:
   said wind deflector is curved so as to be most forwardly disposed at the center thereof, and highest in elevation at the center thereof.

4. A wind deflector arrangement according to claim 1, wherein:
   said supporting arms are resiliently urged upwardly by the resilient force of springs.

5. A wind deflector arrangement according to claim 1, wherein:
   said wind deflector is resiliently urged downwardly by means of said resilient means.

6. A wind deflector arrangement according to claim 1 or 5, wherein:
   said arms are pushed downwardly by pushing means provided on a slide roof member as said slide roof member moves forwardly to close said opening, while said wind deflector is lowered together with said arms until said wind deflector engages on a slide roof frame member; and
   when said slide roof member further advances while said wind deflector engages on said roof frame member, said wind deflector is angularly displaced upwardly and is housed such that said arms and said wind deflector are arranged to be substantially coplanar.

7. A wind deflector arrangement according to claim 1, wherein:
   said wind deflector is provided along the lower edge thereof with a lip-shaped seal member.

8. A wind deflector arrangement according to claim 1, wherein:
   said rear ends of said wind deflector are pivotably connected to said front ends of said supporting arms; and
   said resilient means comprises springs operatively cooperating with said rear ends of said wind deflector and said front ends of said supporting arms at the pivotal connection therebetween so as to normally resiliently urge the forward edge of said wind deflector downwardly relative to said supporting arms.

9. A wind deflector arrangement according to claim 8 wherein:
   second resilient means are provided for urging said supporting arms resiliently upwardly;
   a slide roof member is provided with pushing means for pushing said arms, with said deflector supported thereon, downwardly as said slide roof member moves forwardly to close said opening;
   said wind deflector is movable downwardly together with said arms until said wind deflector engages on a slide roof frame member; and
   upon engagement of said wind deflector with said slide roof frame member, and with further forward movement of said slide roof member to close said opening, said arms are movable further downwardly while said wind deflector is upwardly angularly displaceable relative to said arms until said arms and said wind deflector are arranged to be substantially coplanar in a housed position of said wind deflector.

* * * * *